(12) United States Patent
Yao et al.

(10) Patent No.: US 9,156,505 B2
(45) Date of Patent: Oct. 13, 2015

(54) STRUCTURE FOR JOINING CENTER PILLAR AND ROOF SIDE RAIL

(75) Inventors: Takashi Yao, Toyota (JP); Nobuyuki Torii, Nagoya (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 14/356,230

(22) PCT Filed: Nov. 16, 2011

(86) PCT No.: PCT/JP2011/076438
§ 371 (c)(1),
(2), (4) Date: May 5, 2014

(87) PCT Pub. No.: WO2013/073027
PCT Pub. Date: May 23, 2013

(65) Prior Publication Data
US 2014/0306478 A1  Oct. 16, 2014

(51) Int. Cl.
*B62D 27/02* (2006.01)
*B62D 25/04* (2006.01)
*B62D 25/06* (2006.01)

(52) U.S. Cl.
CPC .............. *B62D 27/023* (2013.01); *B62D 25/04* (2013.01); *B62D 25/06* (2013.01)

(58) Field of Classification Search
CPC .... B62D 25/04; B62D 25/06; B62D 25/2036; B62D 27/023

USPC ........ 296/203.03, 187.12, 187.13, 193.06, 30
See application file for complete search history.

(56) References Cited

U.S. PATENT DOCUMENTS

| | | | | |
|---|---|---|---|---|
| 5,984,402 A | * | 11/1999 | Takeuchi | 296/187.12 |
| 2001/0033096 A1 | * | 10/2001 | Hanyu | 296/203.01 |
| 2003/0141747 A1 | | 7/2003 | Honma et al. | |
| 2009/0174228 A1 | * | 7/2009 | Duguet et al. | 296/214 |
| 2012/0313400 A1 | * | 12/2012 | Balzer et al. | 296/193.06 |

FOREIGN PATENT DOCUMENTS

| | | | |
|---|---|---|---|
| JP | A-9-254729 | | 9/1997 |
| JP | A-2003-212148 | | 7/2003 |
| JP | A-2005-5254 | | 1/2005 |
| JP | 2007131054 A | * | 5/2007 |
| JP | A-2007-131054 | | 5/2007 |
| JP | A-2009-286268 | | 12/2009 |

* cited by examiner

*Primary Examiner* — Jason S Morrow
*Assistant Examiner* — E Turner Hicks
(74) *Attorney, Agent, or Firm* — Oliff PLC

(57) ABSTRACT

An upper end joint portion which has increased rigidity by being bent in a rectangular wave shape and is joined to a roof side rail reinforcement is formed at an upper end portion of a center pillar reinforcement. Then, in the roof side rail reinforcement, longitudinal beads and extending in a direction orthogonal to a vehicle front-back direction are formed further on only the rear side in the vehicle front-back direction than a front-side end edge in the vehicle front-back direction in the upper end joint portion in the upper side in a vehicle up-and-down direction of a joint portion to the center pillar reinforcement.

6 Claims, 4 Drawing Sheets

STRUCTURE FOR JOINING CENTER PILLAR AND ROOF SIDE RAIL

TECHNICAL FIELD

The present invention relates to a structure for joining a center pillar and a roof side rail of a vehicle.

BACKGROUND ART

Patent Literature 1 discloses a joint structure in which a center pillar and a roof side rail are overlapped each other and resistance-welded, whereby the center pillar and the roof side rail are joined to each other. In the structure for joining a center pillar and a roof side rail, in order to suppress occurrence of a break in a joint portion between the center pillar and the roof side rail, a pair of longitudinal beads is formed in a vehicle front-back direction in the roof side rail with a joint portion that is a center extension line of the center pillar interposed therebetween.

CITATION LIST

Patent Literature

[Patent Literature 1] Japanese Unexamined Patent Application Publication No. 2003-212148

SUMMARY OF INVENTION

Technical Problem

In the structure for joining a center pillar and a roof side rail described in Patent Literature 1, the rigidity of the roof side rail against side impact (lateral collision) is enhanced by the longitudinal beads formed in the roof side rail. However, in the structure for joining a center pillar and a roof side rail described in Patent Literature 1, if another vehicle causes a frontal collision (frontal impact) with one's own vehicle, stress is concentrated on the longitudinal bead formed on the front side in the vehicle front-back direction of the joint portion to the center pillar. As a result, since the longitudinal bead becomes the starting point of deformation in the joint portion between the center pillar and the roof side rail, there is a possibility that the deformation of the joint portion between the center pillar and the roof side rail may increase.

Therefore, an object of the present invention is to provide a structure for joining a center pillar and a roof side rail in which it is possible to suppress deformation of a joint portion between a center pillar and a roof side rail at the time of frontal impact.

Solution to Problem

According to an aspect of the present invention, there is provided a structure for joining a center pillar and a roof side rail that is a structure for joining a center pillar extending a vehicle up-and-down direction and a roof side rail extending in a vehicle front-back direction, in which an upper end joint portion which is joined to the roof side rail is formed at an upper end portion of the center pillar, and on an upper side in the vehicle up-and-down direction of the upper end joint portion in the roof side rail, a longitudinal bead extending in a direction orthogonal to the vehicle front-back direction is formed further on only a rear side in the vehicle front-back direction than a line extending from a front-side end edge in the vehicle front-back direction of the upper end joint portion to the upper side in the vehicle up-and-down direction.

According to the structure for joining a center pillar and a roof side rail related to the above aspect of the present invention, since the longitudinal bead is formed in the roof side rail on the upper side in the vehicle up-and-down direction of a joint portion to the center pillar, a reaction force of the joint portion between the center pillar and the roof side rail against frontal impact load is enhanced.

Then, since the longitudinal bead which is formed in the roof side rail is formed further on only the rear side in the vehicle front-back direction than the front-side end edge in the vehicle front-back direction in the joint portion between the center pillar and the roof side rail, it is possible to suppress the concentration of stress in the front side in the vehicle front-back direction of the joint portion at the time of frontal impact. In this way, it is possible to suppress deformation in the joint portion between the center pillar and the roof side rail.

In the structure for joining a center pillar and a roof side rail according to the above aspect of the present invention, a structure may be made in which the upper end joint portion and the roof side rail are joined to each other by welding and the longitudinal bead is formed on an upper side in the vehicle up-and-down direction of a welded portion in which the upper end joint portion and the roof side rail are welded to each other.

In this manner, the upper end joint portion and the roof side rail are welded to each other and the longitudinal bead is formed on the upper side in the vehicle up-and-down direction of the welded portion, whereby it is possible to further improve the rigidity of the joint portion between the center pillar and the roof side rail.

In the structure for joining a center pillar and a roof side rail according to the above aspect of the present invention, a structure may be made in which a lateral bead extending in the vehicle front-back direction is formed in the roof side rail on the upper side in the vehicle up-and-down direction of the upper end joint portion.

Due to such a configuration, since a direction in which the lateral bead is formed coincides with a direction of impact load which is input to the roof side rail at the time of frontal impact, it is possible to improve the rigidity of the roof side rail at the time of frontal impact.

In the structure for joining a center pillar and a roof side rail according to the above aspect of the present invention, a structure may be made in which a plurality of longitudinal beads and a plurality of lateral beads extending in the vehicle front-back direction are formed in the roof side rail.

In this manner, the plurality of longitudinal beads and the plurality of lateral beads are formed in the roof side rail, whereby it is possible to control a deformation mode in the joint portion.

Advantageous Effects of Invention

According to the present invention, it is possible to suppress falling-down of a pillar to the front seat side and also suppress breakage of the pillar at the time of side impact.

DESCRIPTION OF EMBODIMENTS

Figure 1:
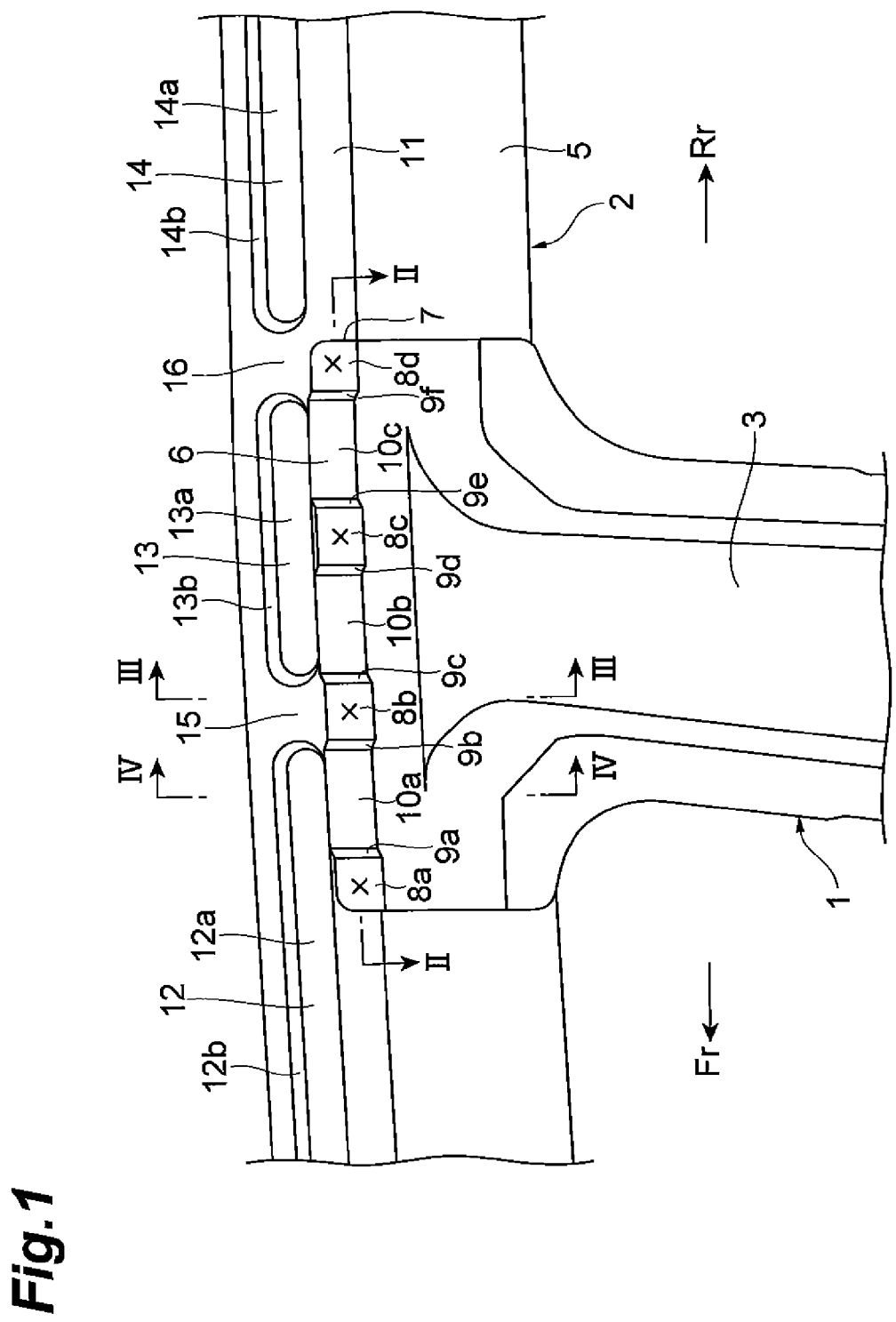
FIG. 1 is a side view when a joint portion between a center pillar and a roof side rail according to an embodiment is viewed from the inside of a vehicle.

Hereinafter, an embodiment of a structure for joining a center pillar and a roof side rail according to the present invention will be described with reference to the drawings. In addition, in each drawing, the same or equivalent element is denoted by the same reference numeral and overlapping description is omitted.

FIG. 1 is a side view when a joint portion between a center pillar and a roof side rail is viewed from the inside of a vehicle. As shown in FIG. 1, this embodiment is a structure for joining a center pillar 1 and a roof side rail 2, and an upper end portion of the center pillar 1 extending in a vehicle up-and-down direction is joined to a central portion of the roof side rail 2 extending a vehicle front-back direction in an upper portion of the vehicle. In addition, a lower end portion of the center pillar 1 is joined to a rocker (not shown) extending the vehicle front-back direction in a lower portion of the vehicle.

Figure 2:
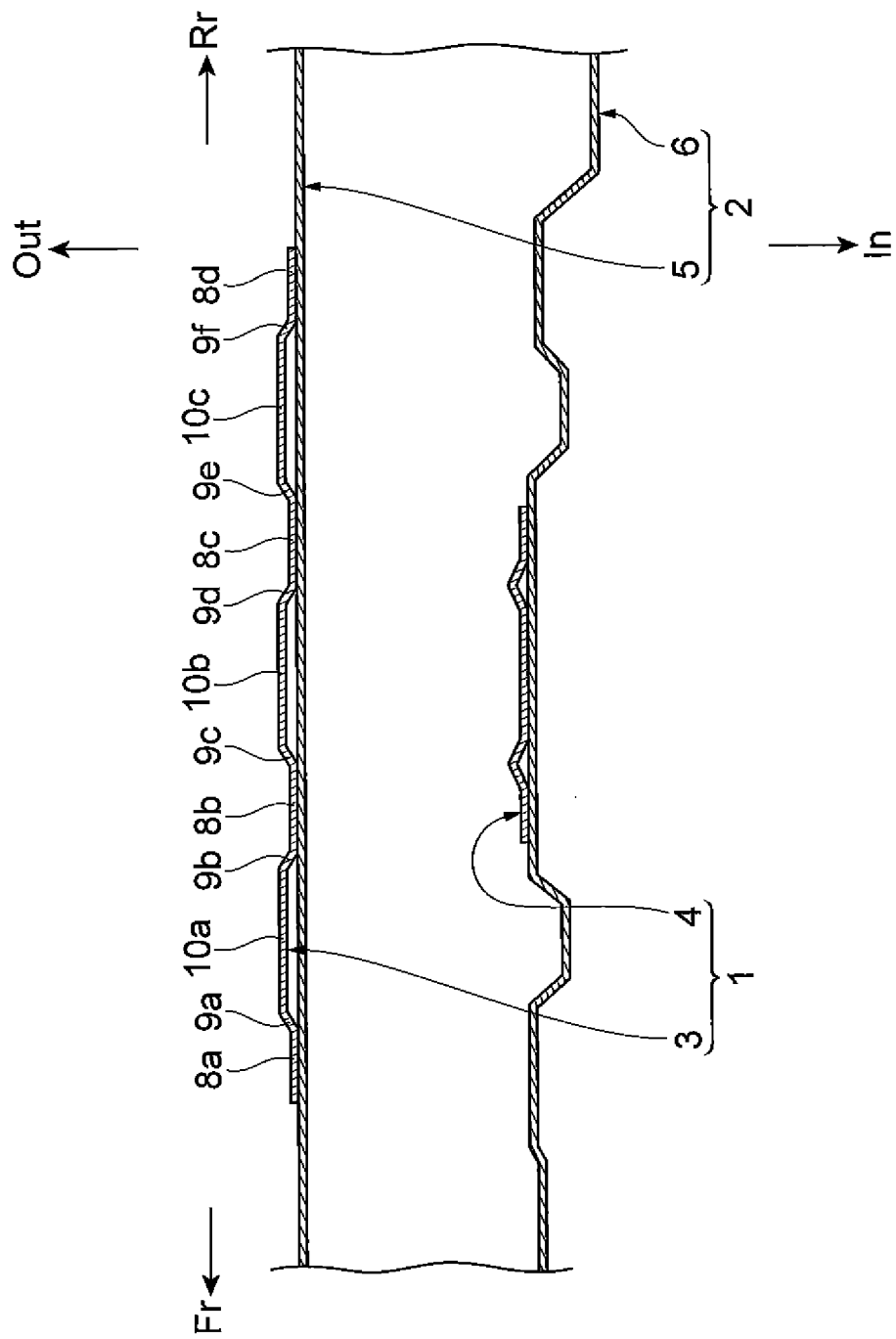
FIG. 2 is a partial cross-sectional view along line II-II shown in FIG. 1.
Figure 3:
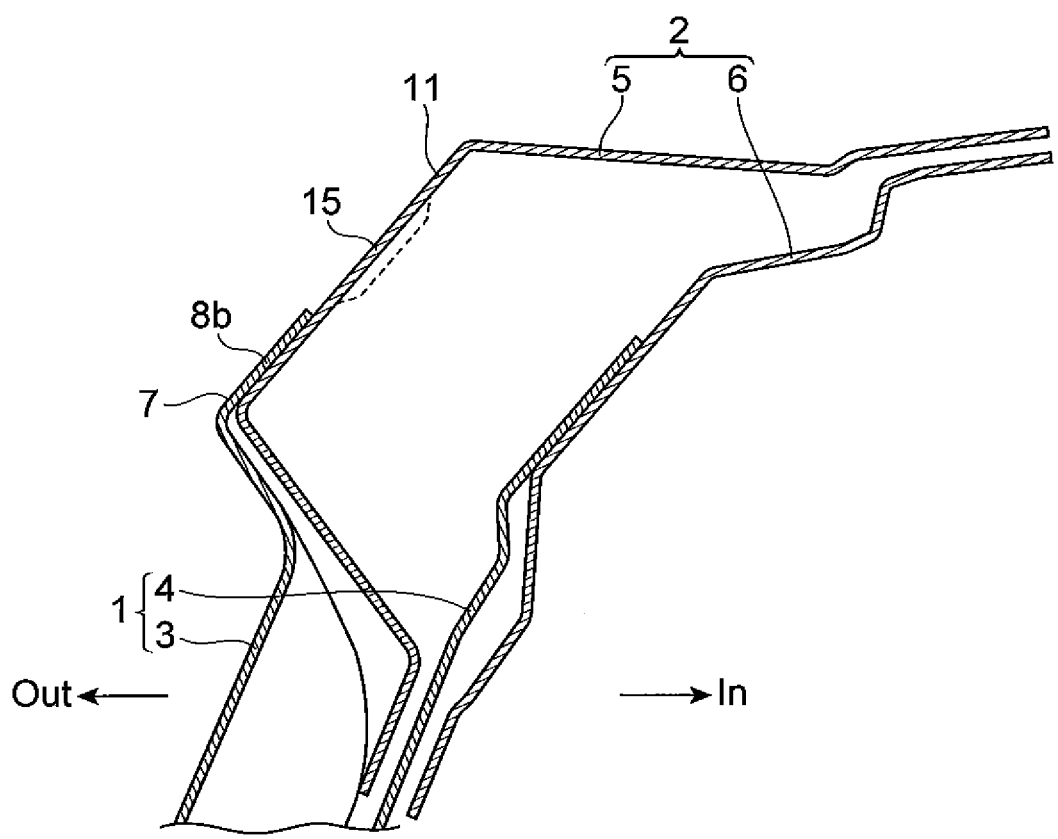
FIG. 3 is a partial cross-sectional view along line III-III shown in FIG. 1.
Figure 4:
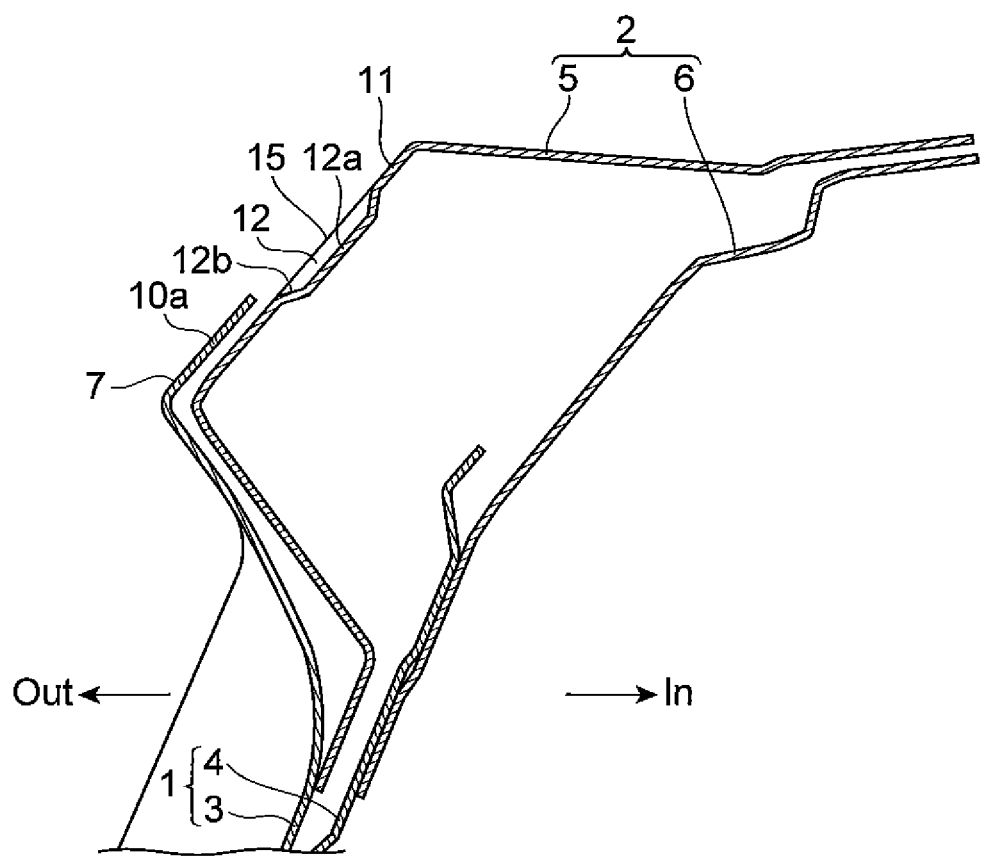
FIG. 4 is a partial cross-sectional view along line IV-IV shown in FIG. 1.

FIG. 2 is a partial cross-sectional view along line II-II shown in FIG. 1. FIG. 3 is a partial cross-sectional view along line III-III shown in FIG. 1. FIG. 4 is a partial cross-sectional view along line IV-IV shown in FIG. 1.

As shown in FIGS. 1 to 4, the center pillar 1 is provided with a center pillar reinforcement 3 which is disposed on the vehicle outside, and a center pillar inner panel 4 which is disposed on the vehicle inside (on the inside of a vehicle interior). The roof side rail 2 is provided with a roof side rail reinforcement 5 which is disposed on the vehicle outside, and a roof side rail inner panel 6 which is disposed on the vehicle inside (on the inside of the vehicle interior).

Then, an upper end portion of the center pillar reinforcement 3 is joined to the roof side rail reinforcement 5, and an upper end portion of the center pillar inner panel 4 is joined to the roof side rail inner panel 6. In addition, the joint of the center pillar reinforcement 3 and the roof side rail reinforcement 5 and the joint of the center pillar inner panel 4 and the roof side rail inner panel 6 can be performed by, for example, resistance welding such as spot welding. In addition, a mark x shown in FIG. 1 indicates the position of a spot welding.

Next, a structure of the center pillar reinforcement 3 will be described in detail.

An upper end joint portion 7 which is joined to the roof side rail reinforcement 5 is formed at the upper end portion of the center pillar reinforcement 3.

The upper end joint portion 7 extends in the vehicle front-back direction along an extension direction of the roof side rail reinforcement 5. The upper end joint portion 7 is bent in a rectangular wave shape along the vehicle front-back direction, whereby rigidity is enhanced.

Describing specifically, the upper end joint portion 7 is provided with a first joint portion 8a which extends from a front-side end edge in the vehicle front-back direction to the rear side in the vehicle front-back direction and is joined to the roof side rail reinforcement 5, a first bent reinforcing portion 9a which extends toward the vehicle outside while being inclined from a rear-side end edge in the vehicle front-back direction of the first joint portion 8a to the rear side in the vehicle front-back direction, a first raised portion 10a which extends toward the rear side in the vehicle front-back direction from an end edge on the vehicle outside of the first bent reinforcing portion 9a, a second bent reinforcing portion 9b which extends toward the vehicle inside while being inclined from a rear-side end edge in the vehicle front-back direction of the first raised portion 10a to the rear side in the vehicle front-back direction, a second joint portion 8b which extends toward the rear side in the vehicle front-back direction from an end edge on the vehicle inside of the second bent reinforcing portion 9b and is joined to the roof side rail reinforcement 5, a third bent reinforcing portion 9c which extends toward the vehicle outside while being inclined from a rear-side end edge in the vehicle front-back direction of the second joint portion 8b to the rear side in the vehicle front-back direction, a second raised portion 10b which extends toward the rear side in the vehicle front-back direction from an end edge on the vehicle outside of the third bent reinforcing portion 9c, a fourth bent reinforcing portion 9d which extends toward the vehicle inside while being inclined from a rear-side end edge in the vehicle front-back direction of the second raised portion 10b to the rear side in the vehicle front-back direction, a third joint portion 8c which extends toward the rear side in the vehicle front-back direction from an end edge on the vehicle inside of the fourth bent reinforcing portion 9d and is joined to the roof side rail reinforcement 5, a fifth bent reinforcing portion 9e which extends toward the vehicle outside while being inclined from a rear-side end edge in the vehicle front-back direction of the third joint portion 8c to the rear side in the vehicle front-back direction, a third raised portion 10c which extends toward the rear side in the vehicle front-back direction from an end edge on the vehicle outside of the fifth bent reinforcing portion 9e, a sixth bent reinforcing portion 9f which extends toward the vehicle inside while being inclined from a rear-side end edge in the vehicle front-back direction of the third raised portion 10c to the rear side in the vehicle front-back direction, and a fourth joint portion 8d which extends toward the rear side in the vehicle front-back direction from an end edge on the vehicle inside of the sixth bent reinforcing portion 9f and is joined to the roof side rail reinforcement 5.

That is, the first raised portion 10a is raised to the vehicle outside with respect to the first joint portion 8a and the second joint portion 8b, whereby the first bent reinforcing portion 9a that is an inclined surface is formed on the rear side in the vehicle front-back direction of the first joint portion 8a and the second bent reinforcing portion 9b that is an inclined surface is formed on the front side in the vehicle front-back direction of the second joint portion 8b. Further, the second raised portion 10b is raised to the vehicle outside with respect to the second joint portion 8b and the third joint portion 8c, whereby the third bent reinforcing portion 9c that is an inclined surface is formed on the front side in the vehicle front-back direction of the second joint portion 8b and the fourth bent reinforcing portion 9d that is an inclined surface is formed on the front side in the vehicle front-back direction of the third joint portion 8c. Further, the third raised portion 10c is raised to the vehicle outside with respect to the third joint portion 8c and the fourth joint portion 8d, whereby the fifth bent reinforcing portion 9e that is an inclined surface is formed on the front side in the vehicle front-back direction of the third joint portion 8c and the sixth bent reinforcing portion 9f that is an inclined surface is formed on the front side in the vehicle front-back direction of the fourth joint portion 8d.

Next, a structure of the roof side rail reinforcement 5 will be described in detail.

A joint surface portion 11 which is joined to the first joint portion 8a, the second joint portion 8b, the third joint portion 8c, and the fourth joint portion 8d of the center pillar reinforcement 3 is formed at the roof side rail reinforcement 5.

A lateral bead 12, a lateral bead 13, and a lateral bead 14 which extend in the vehicle front-back direction, and a longitudinal bead 15 and a longitudinal bead 16 which extend in a direction orthogonal to the vehicle front-back direction are formed in the joint surface portion 11.

The lateral bead 12 extends in the vehicle front-back direction over a range from the upper side in the vehicle up-and-down direction further on the front side in the vehicle front-back direction than the first joint portion 8a to the upper side in the vehicle up-and-down direction of the second bent reinforcing portion 9b when viewed from the side of the vehicle. In the lateral bead 12, the joint surface portion 11 is recessed to the vehicle inside, whereby a bottom face portion 12a which becomes a bottom face of the lateral bead 12 and a peripheral wall portion 12b which extends to the vehicle inside while being inclined from the joint surface portion 11 to the inside of the lateral bead 12 and is connected to an outer peripheral end edge of the bottom face portion 12a are formed. In addition, in the lateral bead 12, the peripheral wall portion 13b is bent with respect to the joint surface portion 11 and the bottom face portion 12a, whereby rigidity is enhanced.

The lateral bead 13 extends in the vehicle front-back direction over a range from the upper side in the vehicle up-and-down direction of the third bent reinforcing portion 9c to the upper side in the vehicle up-and-down direction of the sixth bent reinforcing portion 9f when viewed from the side of the vehicle. In the lateral bead 13, the joint surface portion 11 is recessed to the vehicle inside, whereby a bottom face portion 13a which becomes a bottom face of the lateral bead 13 and a peripheral wall portion 13b which extends to the vehicle inside while being inclined from the joint surface portion 11 to the inside of the lateral bead 13 and is connected to an outer peripheral end edge of the bottom face portion 13a are formed. In addition, in the lateral bead 13, the peripheral wall portion 13b is bent with respect to the joint surface portion 11 and the bottom face portion 13a, whereby rigidity is enhanced.

The lateral bead 14 extends in the vehicle front-back direction in the upper side in the vehicle up-and-down direction further on the rear side in the vehicle front-back direction than the fourth joint portion 8d when viewed from the side of the vehicle. In the lateral bead 14, the joint surface portion 11 is recessed to the vehicle inside, whereby a bottom face portion 14a which becomes a bottom face of the lateral bead 14 and a peripheral wall portion 14b which extends to the vehicle inside while being inclined from the joint surface portion 11 to the inside of the lateral bead 14 and is connected to an outer peripheral end edge of the bottom face portion 14a are formed. In addition, in the lateral bead 14, the peripheral wall portion 14b is bent with respect to the joint surface portion 11 and the bottom face portion 14a, whereby rigidity is enhanced.

The longitudinal bead 15 extends in a direction orthogonal to the vehicle front-back direction in the upper side in the vehicle up-and-down direction of the second bent reinforcing portion 9b, the second joint portion 8b, and the third bent reinforcing portion 9c when viewed from the side of the vehicle. The longitudinal bead 15 is formed by the lateral bead 12 and the lateral bead 13. That is, the longitudinal bead 15 is formed by the peripheral wall portion 12b of the lateral bead 12, the peripheral wall portion 13b of the lateral bead 13, and the portion of the joint surface portion 11, which is located between the peripheral wall portion 12b and the peripheral wall portion 13b. Then, the peripheral wall portion 12b configuring the longitudinal bead 15 is located at the same position as the second bent reinforcing portion 9b in the vehicle front-back direction, and the peripheral wall portion 13b configuring the longitudinal bead 15 is located at the same position as the third bent reinforcing portion 9c in the vehicle front-back direction. In addition, in the longitudinal bead 15, rigidity is enhanced by bending the peripheral wall portion 12b with respect to the joint surface portion 11 and the bottom face portion 12a and bending the peripheral wall portion 13b with respect to the joint surface portion 11 and the bottom face portion 13a.

The longitudinal bead 16 extends in a direction orthogonal to the vehicle front-back direction in the upper side in the vehicle up-and-down direction of the sixth bent reinforcing portion 9f and the fourth joint portion 8d when viewed from the side of the vehicle. The longitudinal bead 16 is formed by the lateral bead 13 and the lateral bead 14. That is, the longitudinal bead 16 is formed by the peripheral wall portion 13b of the lateral bead 13, the peripheral wall portion 14b of the lateral bead 14, and the portion of the joint surface portion 11, which is located between the peripheral wall portion 13b and the peripheral wall portion 14b. Then, the peripheral wall portion 13b configuring the longitudinal bead 16 is located at the same position as the sixth bent reinforcing portion 9f in the vehicle front-back direction. In addition, in the longitudinal bead 16, rigidity is enhanced by bending the peripheral wall portion 13b with respect to the joint surface portion 11 and the bottom face portion 13a and bending the peripheral wall portion 14b with respect to the joint surface portion 11 and the bottom face portion 14a.

In this manner, in this embodiment, a longitudinal bead is not formed on the upper side in the vehicle up-and-down direction of the first joint portion 8a which is located at the front-side end edge in the vehicle front-back direction in the upper end joint portion 7. For this reason, it is possible to suppress the concentration of stress on the front side in the vehicle front-back direction of the joint portion between the center pillar 1 and the roof side rail 2 when impact load is input to the roof side rail 2 due to frontal impact. In this way, the deformation of the joint portion between the center pillar 1 and the roof side rail 2 is suppressed.

Further, in this embodiment, the first joint portion 8a, the second joint portion 8b, the third joint portion 8c, and the fourth joint portion 8d are joined to the joint surface portion 11 by welding, and the longitudinal bead 15 and the longitudinal bead 16 are formed on the upper sides in the vehicle up-and-down direction of the second joint portion 8b and the fourth joint portion 8d. For this reason, the rigidity of the joint portion between the center pillar 1 and the roof side rail 2 is enhanced due to the rigidity of the center pillar reinforcement 3 and the rigidity of the longitudinal bead 15 and the longitudinal bead 16.

In particular, in this embodiment, the peripheral wall portion 12b of the longitudinal bead 15, the peripheral wall portion 13b of the longitudinal bead 15, and the peripheral wall portion 13b of the longitudinal bead 15, in all of which rigidity is enhanced, are respectively formed on the upper sides in the vehicle up-and-down direction of the second bent reinforcing portion 9b, the third bent reinforcing portion 9c, and the sixth bent reinforcing portion 9f, in all of which rigidity is enhanced. For this reason, the rigidity of the joint portion between the center pillar 1 and the roof side rail 2 is further increased.

Further, in this embodiment, since a direction in which the lateral bead 12, the lateral bead 13, and the lateral bead 14 are formed coincides with a direction of impact load which is input to the roof side rail 2 at the time of frontal impact, the rigidity of the roof side rail 2 at the time of frontal impact is improved.

The preferred embodiment of the present invention has been described above. However, the present invention is not limited to the embodiment described above.

For example, in the embodiment described above, the longitudinal bead has been described as being formed by the lateral beads adjacent to each other. However, as long as a longitudinal bead extends in a direction orthogonal to the vehicle front-back direction, any structure is also acceptable. For example, the longitudinal bead may have the form of a groove extending in a direction orthogonal to the vehicle front-back direction.

Further, in the embodiment described above, a configuration has been described in which the longitudinal beads are formed on the upper sides in the vehicle up-and-down direction of the second joint portion 8b and the fourth joint portion 8d. However, it is acceptable if a longitudinal bead is formed further on only the rear side in the vehicle front-back direction than a line extending from the front-side end edge in the vehicle front-back direction in the upper end joint portion 7 to the upper side in the vehicle up-and-down, in the upper side in the vehicle up-and-down direction of the upper end joint portion 7, and a forming position thereof can be appropriately set. By appropriately setting a position where a longitudinal bead is formed or a position where a longitudinal bead is not formed, it is possible to control a deformation mode in the joint portion between the center pillar and the roof side rail or input load to each welded place in the joint portion between the center pillar and the roof side rail.

Further, in the embodiment described above, a configuration has been described in which the upper end joint portion 7 is bent in a rectangular wave shape, and thus the center pillar reinforcement 3 and the roof side rail reinforcement 5 are intermittently joined to each other along the vehicle front-back direction. However, the shape of the upper end joint portion 7 is not particularly limited, and the center pillar reinforcement 3 and the roof side rail reinforcement 5 may be continuously joined to each other.

INDUSTRIAL APPLICABILITY

The present invention can be used in a structure for joining a center pillar and a roof side rail of a vehicle.

REFERENCE SIGNS LIST

1: center pillar
2: roof side rail
3: center pillar reinforcement
4: center pillar inner panel
5: roof side rail reinforcement
6: roof side rail inner panel
7: upper end joint portion
8a: first joint portion (welded portion)
8b: second joint portion (welded portion)
8c: third joint portion (welded portion)
8d: fourth joint portion (welded portion)
9a: first bent reinforcing portion
9b: second bent reinforcing portion
9c: third bent reinforcing portion
9d: fourth bent reinforcing portion
9e: fifth bent reinforcing portion
9f: sixth bent reinforcing portion
10a: first raised portion
10b: second raised portion
10c: third raised portion
11: joint surface portion
12: lateral bead
12a: bottom face portion
12b: peripheral wall portion
13: lateral bead
13a: bottom face portion
13b: peripheral wall portion
14: lateral bead
14a: bottom face portion
14b: peripheral wall portion
15: longitudinal bead
16: longitudinal bead

The invention claimed is:

1. A structure for joining a center pillar and a roof side rail that is a structure for joining a center pillar extending in a vehicle up-and-down direction and a roof side rail extending in a vehicle front-back direction, wherein
   an upper end joint portion having a plurality of joint portions which is joined to the roof side rail is formed at an upper end portion of the center pillar,
   on an upper side in the vehicle up-and-down direction of the upper end joint portion in the roof side rail, a longitudinal bead extending in a direction orthogonal to the vehicle front-back direction is formed further on only a rear side in the vehicle front-back direction than a line extending from a front-side end edge in the vehicle front-back direction of the upper end joint portion to the upper side in the vehicle up-and-down direction,
   the upper end joint portion comprises
      a front side bent reinforcing portion which extends toward the vehicle outside while being inclined from a front-side end edge in the vehicle front-back direction of the joint portion to the front side in the vehicle front-back direction, and
      a rear side bent reinforcing portion which extends toward the vehicle outside while being inclined from a rear-side end edge in the vehicle front-back direction of the joint portion to the rear side in the vehicle front-back direction,
   the longitudinal bead is formed at the same position in the vehicle front-back direction as at least one of the joint portions and on the upper side in the vehicle up-and-down direction of the joint portion, and
   the longitudinal bead is formed at the same position in the vehicle front-back direction as the front side bent reinforcing portion and the rear side bent reinforcing portion.

2. The structure for joining a center pillar and a roof side rail according to claim 1, wherein
   the upper end joint portion and the roof side rail are joined to each other by welding, and
   the longitudinal bead is formed on an upper side in the vehicle up-and-down direction of a welded portion in which the upper end joint portion and the roof side rail are welded to each other.

3. The structure for joining a center pillar and a roof side rail according to claim 1, wherein
   a lateral bead extending in the vehicle front-back direction is formed in the roof side rail on the upper side in the vehicle up-and-down direction of the upper end joint portion.

4. The structure for joining a center pillar and a roof side rail according to claim 1, wherein
   a plurality of longitudinal beads and a plurality of lateral beads extending in the vehicle front-back direction are formed in the roof side rail.

5. The structure for joining a center pillar and a roof side rail according to claim 1, wherein the longitudinal bead is formed in a joint surface portion of the roof side rail, to which the joint portions are joined.

6. The structure for joining a center pillar and a roof side rail according to claim 1, wherein
longitudinal beads are not formed on the upper side in the vehicle up-and-down direction of the joint portion which is located at the front-side end edge in the vehicle front-back direction of the upper end joint portion and at the same position in the vehicle front-back direction.

* * * * *